Figures 1, 2, 3:
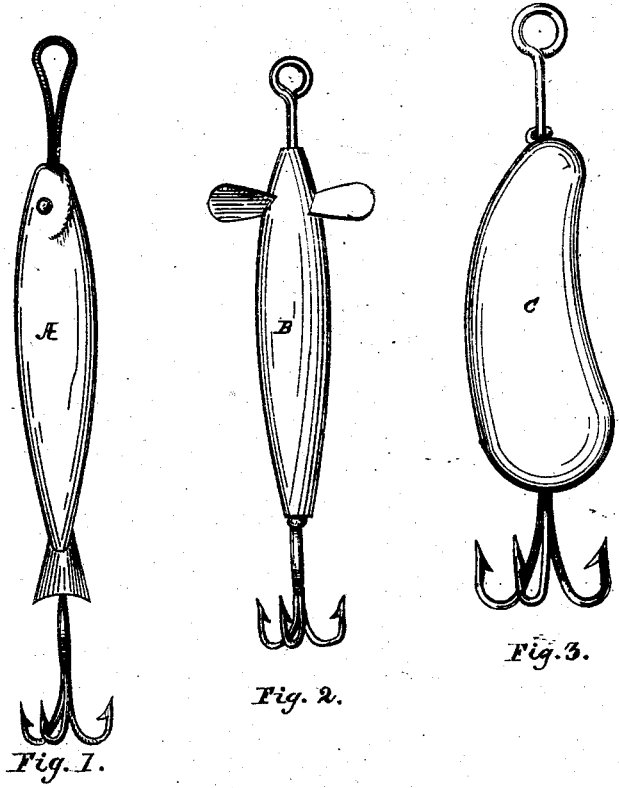

(No Model.)

E. F. PFLUEGER.
ARTIFICIAL FISH BAIT.

No. 272,317. Patented Feb. 13, 1883.

Witnesses:
C. F. Wagoner
Dayton A. Doyle

Inventor:
Ernest F. Pflueger,
by C. R. Humphrey
Atty.

UNITED STATES PATENT OFFICE.

ERNEST F. PFLUEGER, OF AKRON, OHIO.

ARTIFICIAL FISH-BAIT.

SPECIFICATION forming part of Letters Patent No. 272,317, dated February 13, 1883.

Application filed June 23, 1882. (No model.)

*To all whom it may concern:*

Be it known that I, ERNEST F. PFLUEGER, of Akron, in the county of Summit and State of Ohio, have invented a new and useful Improvement in Artificial Fish-Baits, of which the following is a specification.

My invention has relation to that class of artificial baits in which a gaudy, brilliant, or rapidly-moving object is used to attract the fish, so that they may be seized by a hook connected with such object.

Experience has demonstrated that many kinds of fish, and especially the larger voracious fish, lie secluded during the daylight and seek their food as the darkness approaches, at which time the artificial baits in ordinary use are not readily seen or taken by them. To obviate this difficulty, and to produce an artificial bait which may be used in the evening, when ordinary baits are practically useless, is the object of my invention.

My invention will be readily understood by reference to the accompanying drawings, which exhibit three kinds of artificial baits with hooks, in which—

Figure 1 is the artificial minnow; Fig. 2, the "devon" or "angel," and Fig. 3 the "spoon."

My invention consists in coating the showy or attractive parts of the bait with a substance which shall be luminous in the darkness.

It may be applied upon the outside of any of the objects shown in the accompanying drawings—as the minnow A, devon B, or spoon C—or to any other of various shapes in which artificial baits are constructed, and the minnows and other ellipsoidal forms may be constructed hollow, of glass, and coated with the substance upon their inner surface.

The material used should be in the form of a paint, and may be either self-luminous—as phosphoric compounds—or luminous by an inherent retentive power, whereby after having been exposed to light it remains luminous for hours afterward. The substance which I prefer to employ is a paint composed of sulphide of calcium and a drying oil or varnish; but any other luminous or phosphorescent material or compound may be used.

A bait thus constructed can be used as any ordinary bait in the daylight, and as evening approaches or in the shaded and darker places in the water it becomes luminous and affords a bright object to attract the fish.

I am aware that lamps, lanterns, and luminous objects have been employed as decoys to entice fish into nets and to bait; but such is not my invention and is not claimed.

I claim as my invention—

As a new article of manufacture, an artificial fish-bait coated with a substance which is luminous in the darkness and having one or more fish-hooks attached thereto, substantially as and for the purpose specified.

In testimony that I claim the foregoing I have hereunto set my hand this 17th day of June, A. D. 1882.

ERNEST F. PFLUEGER.

Witnesses:
C. P. HUMPHREY,
E. W. STUART.